(12) United States Patent
Kwon et al.

(10) Patent No.: US 11,493,741 B2
(45) Date of Patent: Nov. 8, 2022

(54) REFLECTIVE MODULE AND CAMERA MODULE INCLUDING THE SAME

(71) Applicant: SAMSUNG ELECTRO-MECHANICS CO., LTD., Suwon-si (KR)

(72) Inventors: Young Hwan Kwon, Suwon-si (KR); Young Bok Yoon, Suwon-si (KR); Bo Sung Seo, Suwon-si (KR); Kum Kyung Lee, Suwon-si (KR); Jung Woo Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 488 days.

(21) Appl. No.: 16/590,550

(22) Filed: Oct. 2, 2019

(65) Prior Publication Data

US 2020/0363614 A1 Nov. 19, 2020

(30) Foreign Application Priority Data

May 17, 2019 (KR) .......................... 10-2019-0058289

(51) Int. Cl.
*G02B 7/02* (2021.01)
*G02B 15/14* (2006.01)
*G03B 17/02* (2021.01)
*G03B 3/10* (2021.01)
(Continued)

(52) U.S. Cl.
CPC .............. *G02B 15/14* (2013.01); *G02B 7/09* (2013.01); *G02B 13/009* (2013.01); *G03B 3/10* (2013.01);
(Continued)

(58) Field of Classification Search
CPC ........ G02B 15/14; G02B 7/09; G02B 13/009; G03B 3/10; G03B 5/02; G03B 17/02; H04N 5/2252; H04N 5/2254; H04N 5/2257
(Continued)

(56) References Cited

U.S. PATENT DOCUMENTS 10,334,146 B2 6/2019 Im et al.
2009/0303594 A1 12/2009 Lim et al.
(Continued)

FOREIGN PATENT DOCUMENTS

CN 105509718 A 4/2016
CN 207992659 U 10/2018
(Continued)

OTHER PUBLICATIONS

Korean Office Action dated Apr. 6, 2020 in corresponding Korean Patent Application No. 10-2019-0058289 (11 pages in English, 6 pages in Korean).
(Continued)

*Primary Examiner* — William Choi
(74) *Attorney, Agent, or Firm* — NSIP Law

(57) ABSTRACT

A reflective module includes a rotation plate supported by an internal wall of a housing; and a movable holder supported by the rotation plate and including a reflective member. The movable holder moves the reflective member in a first axis direction perpendicular to an optical axis and in a second axis direction perpendicular to the optical axis and the first axis direction. At least two ball members aligned in the first axis direction are disposed in at least one of a first gap between the housing and the rotation plate and a second gap between the rotation plate and the movable holder. A guide groove is disposed in the rotation plate and in at least one of the housing and the movable holder, and the ball members (Continued)

are inserted into the guide grooves. The ball members are inserted into and three-point supported by the guide grooves.

19 Claims, 13 Drawing Sheets

(51) Int. Cl.
　　*G03B 5/02* (2021.01)
　　*G02B 7/09* (2021.01)
　　*H04N 5/225* (2006.01)
　　*G02B 13/00* (2006.01)

(52) U.S. Cl.
　　CPC .............. *G03B 5/02* (2013.01); *G03B 17/02* (2013.01); *H04N 5/2252* (2013.01); *H04N 5/2254* (2013.01); *H04N 5/2257* (2013.01)

(58) Field of Classification Search
　　USPC .......................................... 359/811, 819, 822
　　See application file for complete search history.

(56) References Cited

U.S. PATENT DOCUMENTS

| | | |
|---|---|---|
| 2014/0009631 A1 | 1/2014 | Topliss |
| 2014/0255016 A1 | 9/2014 | Kim et al. |
| 2015/0346587 A1 | 12/2015 | Lim et al. |
| 2016/0102976 A1 | 4/2016 | Muller et al. |
| 2018/0224665 A1* | 8/2018 | Im .................... G02B 26/0816 |
| 2018/0246293 A1 | 8/2018 | Lim et al. |
| 2018/0356645 A1 | 12/2018 | Jeong et al. |
| 2018/0364450 A1 | 12/2018 | Lee et al. |
| 2018/0367714 A1 | 12/2018 | Im et al. |

FOREIGN PATENT DOCUMENTS

| | | |
|---|---|---|
| CN | 109143528 A | 1/2019 |
| CN | 109151263 A | 1/2019 |
| KR | 10-2009-0127628 A | 12/2009 |
| KR | 10-2015-0138034 A | 12/2015 |
| KR | 10-1666087 B1 | 10/2016 |
| KR | 10-1771439 B1 | 8/2017 |
| KR | 10-1892857 B1 | 8/2018 |

OTHER PUBLICATIONS

Chinese Office Action dated Jun. 20, 2022 in corresponding Chinese Patent Application No. 201911364916.4 (6 pages in English, 8 pages in Chinese).

\* cited by examiner

REFLECTIVE MODULE AND CAMERA MODULE INCLUDING THE SAME

CROSS-REFERENCE TO RELATED APPLICATIONS

This application claims the benefit under 35 USC 119(a) of Korean Patent Application No. 10-2019-0058289 filed on May 17, 2019 in the Korean Intellectual Property Office, the entire disclosure of which is incorporated herein by reference for all purposes.

BACKGROUND

1. Field

The following description relates to a reflective module and a camera module including the same.

2. Description of Background

Cameras have been mounted in portable electronic devices such as smartphones, tablet PCs, laptop computers, and the like, and cameras for a mobile terminal device have been designed to include an autofocusing function, an image stabilization function, a zoom function, and the like.

When an image stabilization function is implemented by a folded module including a reflective member, rotation of the reflective member may need to be accurately implemented to accurately reflect incident light. However, it may be difficult to implement rotation of a reflective member accurately when a structure for implementing rotation of the reflective member is complex and the structure is provided in a limited space.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A camera module in which rotation of a reflective member may be implemented in a simplified structure and rotation of the reflective member may be accurately implemented.

In one general aspect, a reflective module includes a rotation plate supported by an internal wall of a housing; and a movable holder supported by the rotation plate and including a reflective member. The movable holder moves the reflective member in a first axis direction perpendicular to an optical axis and in a second axis direction perpendicular to the optical axis and the first axis direction. At least two ball members aligned in the first axis direction are disposed in at least one of a first gap between the housing and the rotation plate and a second gap between the rotation plate and the movable holder. A guide groove is disposed in the rotation plate and in at least one of the housing and the movable holder, and the ball members are inserted into the guide grooves. The ball members are inserted into and three-point supported by the guide grooves.

Each guide groove may include three side surfaces on which the respective ball member is three-point supported.

Lines formed by extending the three side surfaces of each guide groove may form a triangular pyramid.

The triangular pyramid may be an equilateral triangular pyramid.

Each guide groove may have a shape formed by cutting four corners of the triangular pyramid.

An internal bottom surface of each guide groove may have a triangular shape.

Each ball member may not contact the bottom surface of the respective guide groove.

Side surfaces of each guide groove may include three first surfaces by which the ball member is supported and three second surfaces disposed adjacent to two of the three first surfaces.

Each ball member may not contact any of the second surfaces.

An opening of each guide groove may have a hexagonal shape.

At least two first ball members aligned in the first axis direction may be disposed in the first gap, and at least two second ball members aligned in the second axis direction may be disposed in the second gap.

The rotation plate may rotate with respect to a first axis of the first axis direction, and the movable holder may rotate with respect to a second axis of the second axis direction.

The housing may include one of a pulling yoke or a pulling magnet and the movable holder may include the other of the pulling yoke or the pulling magnet, and the movable holder and the rotation plate may be supported by the internal wall of the housing by attractive force produced between the pulling yoke and the pulling magnet.

A number of the at least two ball members aligned in the first axis direction may be two, and the guide grooves may be symmetrical to each other with respect to a line in parallel to the second axis direction.

In another general aspect, a camera module includes a housing defining an internal space; a reflective module disposed in the internal space; and a lens module including at least one lens barrel aligned in an optical axis direction to receive incident light reflected from the reflective member, and the at least one lens barrel includes a plurality of lenses to selectively move in the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
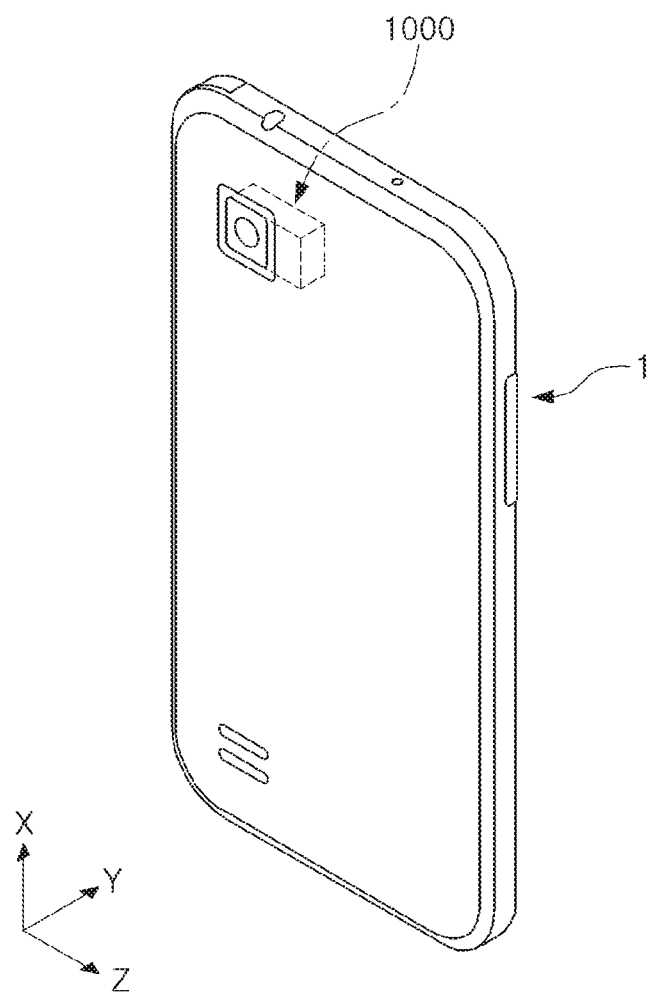
FIG. 1 is a perspective diagram illustrating a portable electronic device according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a perspective diagram illustrating a portable electronic device according to an example.

Referring to FIG. 1, a portable electronic device 1 may be implemented as a portable electronic device such as a mobile communication terminal device, a smartphone, a tablet PC, and the like, on which a camera module 1000 is mounted.

As illustrated in FIG. 1, the portable electronic device 1 may include a camera module 1000 to image an object.

In the example, the camera module 1000 may include a plurality of lenses, and an optical axis (Z axis) of the lenses may be disposed in a direction perpendicular to a thickness direction (Y axis direction; a direction from a front surface to a rear surface of the portable electronic device or a direction opposite to the above-described direction) of the portable electronic device 1.

As an example, the optical axis (Z axis) of the plurality of lenses provided in the camera module 1000 may be formed in a width direction or a length direction (X axis direction or Z axis direction) of the portable electronic device 1.

Accordingly, even when the camera module 1000 includes functions such as an autofocusing (AF) function, a zoom function, an optical image stabilization (OIS) function, and the like, a thickness of the portable electronic device 1 may be minimized. Thus, the portable electronic device 1 may have a reduced size.

The camera module 1000 may include at least one of an AF function, a zoom function, and an OIS function.

The camera module 1000 including an AF function, a zoom function, an OIS function, and other functions may include various components. Accordingly, a size of the camera module 1000 may increase as compared to a general camera module.

When a size of the camera module 1000 increases, it may be difficult to reduce a size of the portable electronic device 1 on which the camera module 1000 is mounted.

For example, generally, in a camera module, an increased number of lenses may be provided and stacked to perform a zoom function, and when a plurality of lenses is stacked in a thickness direction of a portable electronic device, a thickness of the portable electronic device may increase in accordance with the number of stacked lenses. Accordingly, unless a thickness of the portable electronic device is increased, it may be difficult to sufficiently secure the number of stacked lenses, which may deteriorate a zoom function.

Also, to implement an AF function and an OIS function, it may be required to install an actuator moving a lens group in an optical axis direction or a direction perpendicular to an optical axis direction. When an optical axis (Z axis) of the lens group is formed in a thickness direction of the portable electronic device, the actuator for moving the lens group may also need to be installed in a thickness direction of the portable electronic device. Accordingly, a thickness of the portable electronic device may increase.

However, in the camera module 1000 in the example, as an optical axis (Z axis) of a plurality of lenses is disposed in a direction perpendicular to a thickness direction of the portable electronic device 1, even when the camera module 1000 including an AF function, a zoom function, and an OIS function is mounted, the portable electronic device 1 may have a reduced size.

Figure 2:
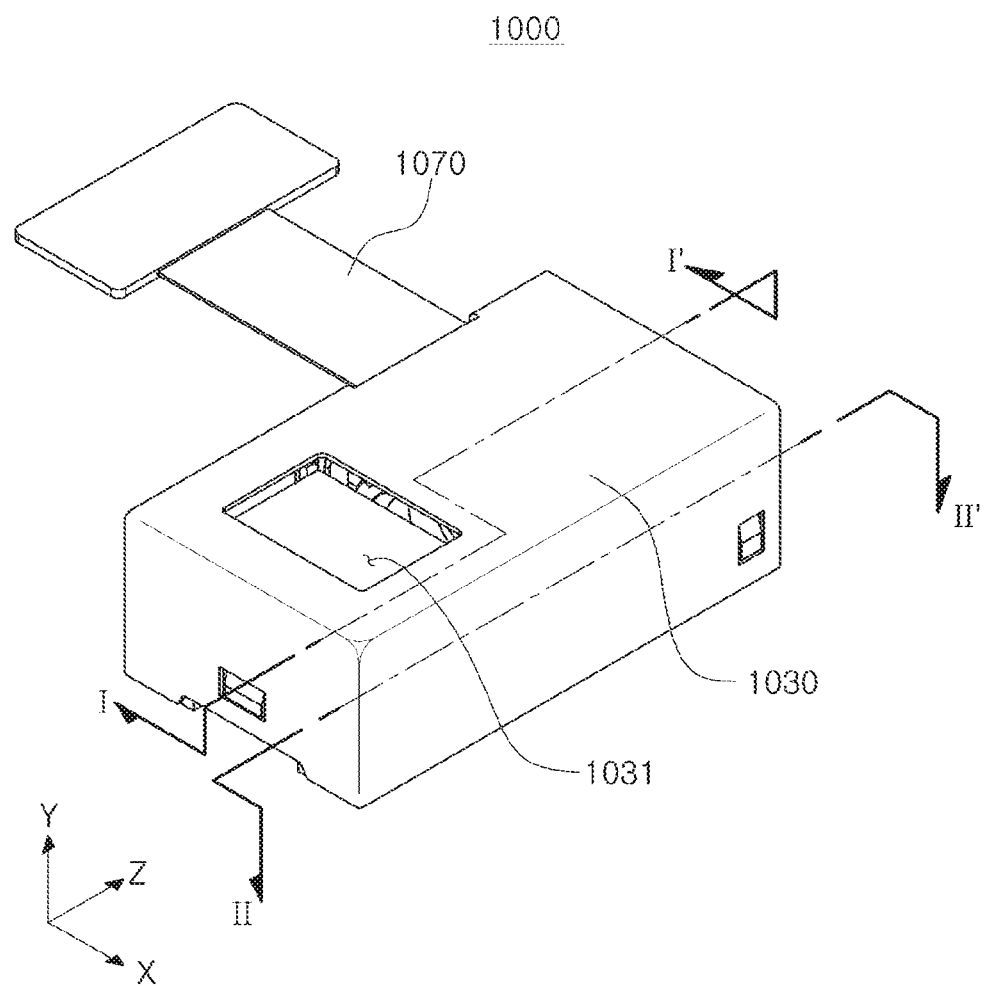
FIG. 2 is a perspective diagram illustrating a camera module according to an example.
Figure 3A:
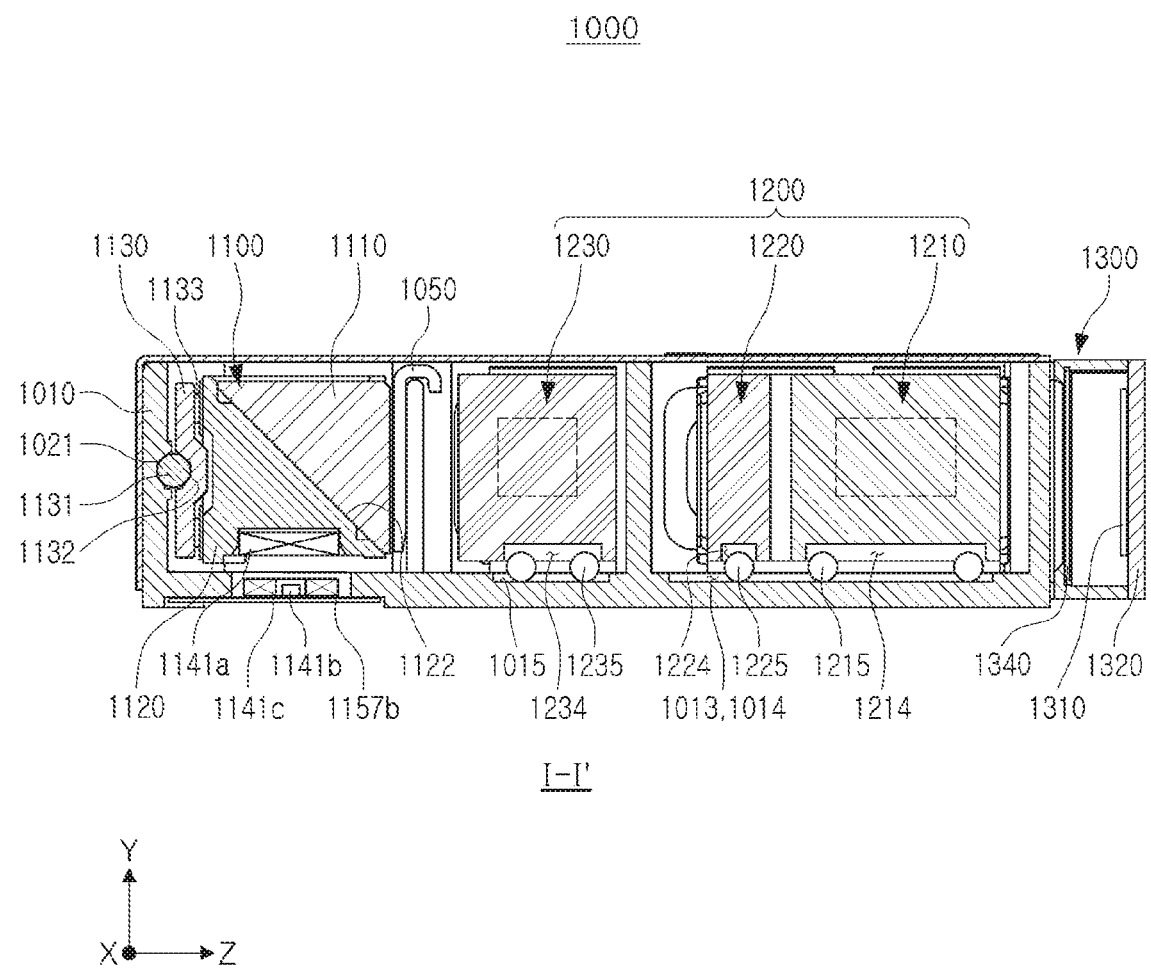
FIGS. 3A and 3B are cross-sectional diagrams illustrating a camera module according to an example.
Figure 3B:
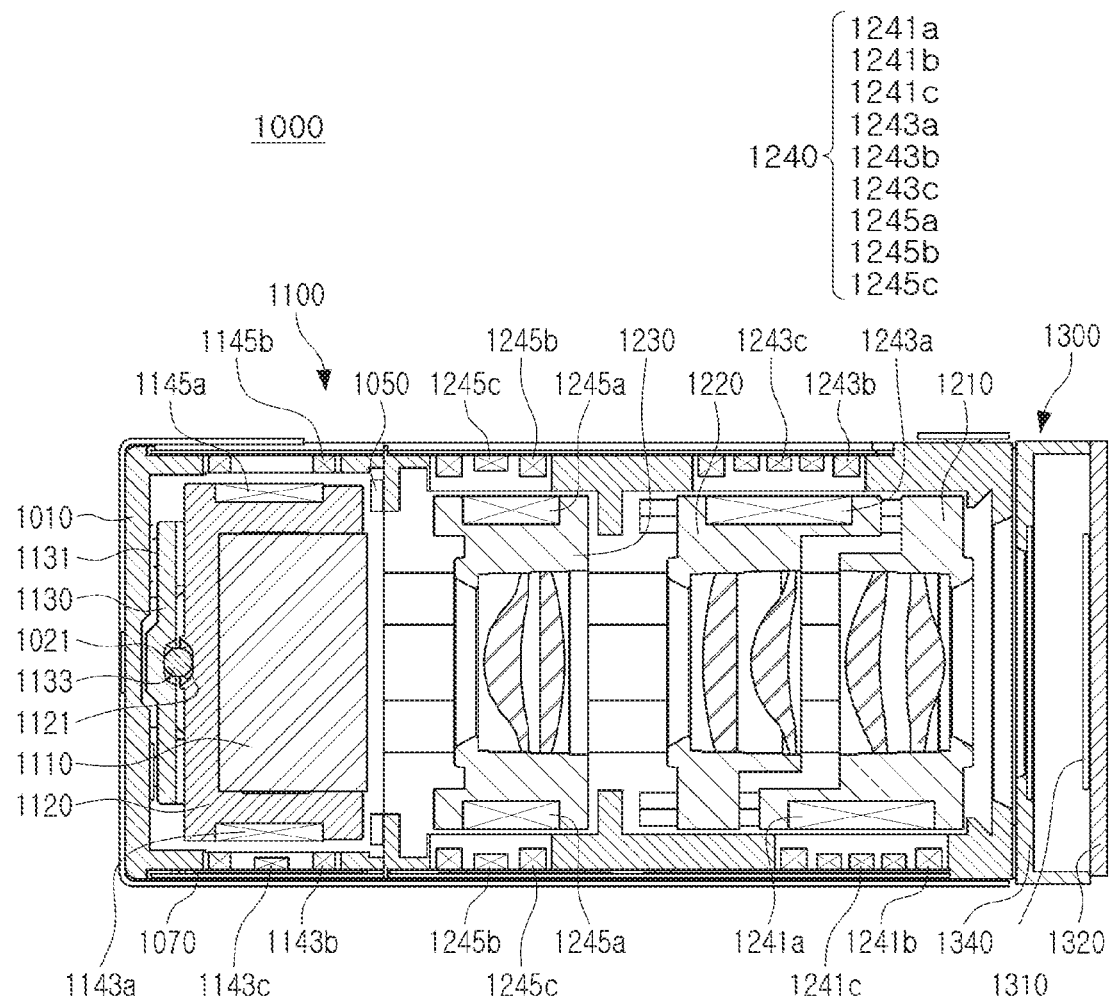
Figure 4:
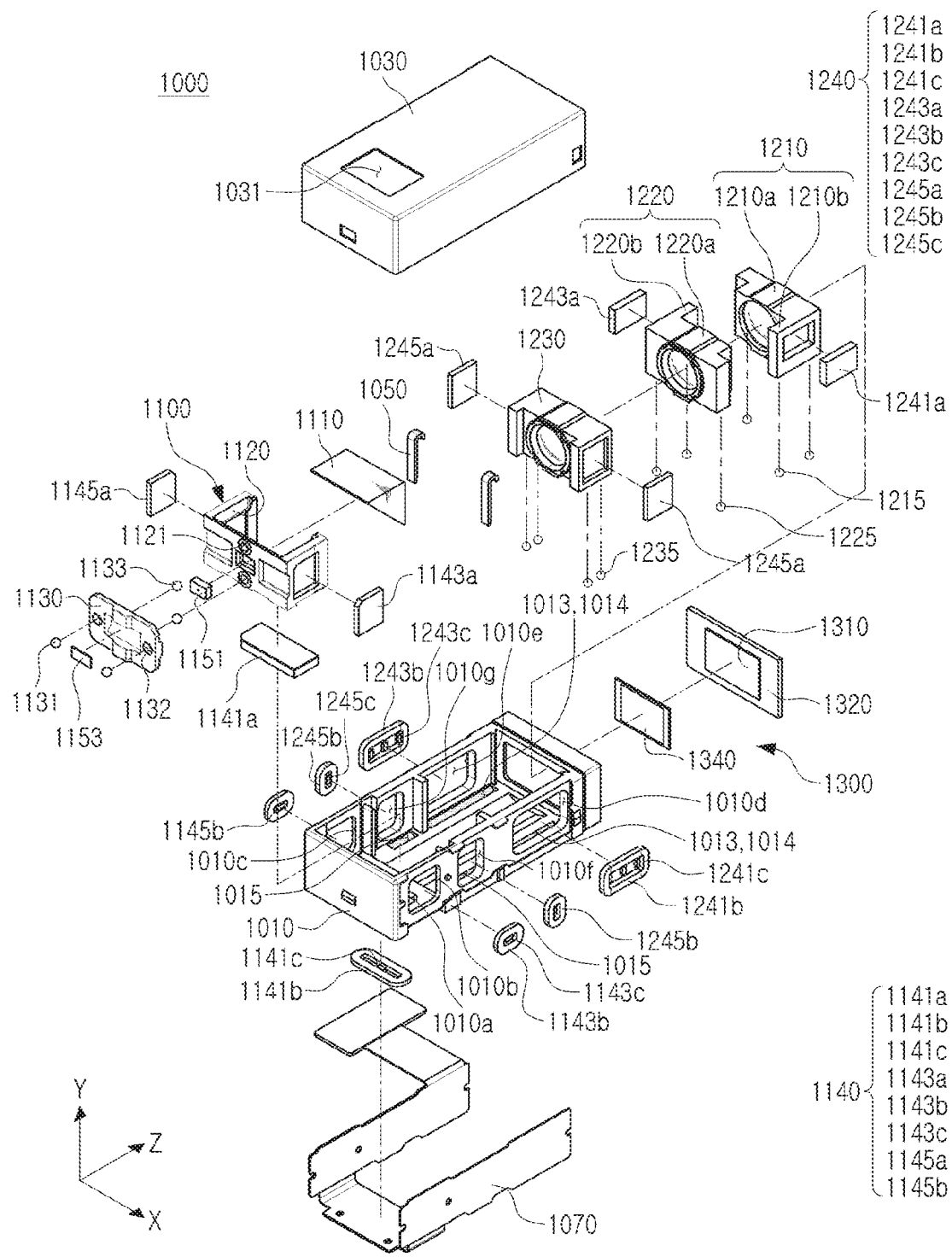
FIG. 4 is an exploded perspective diagram illustrating a camera module according to an example.
Figure 5:
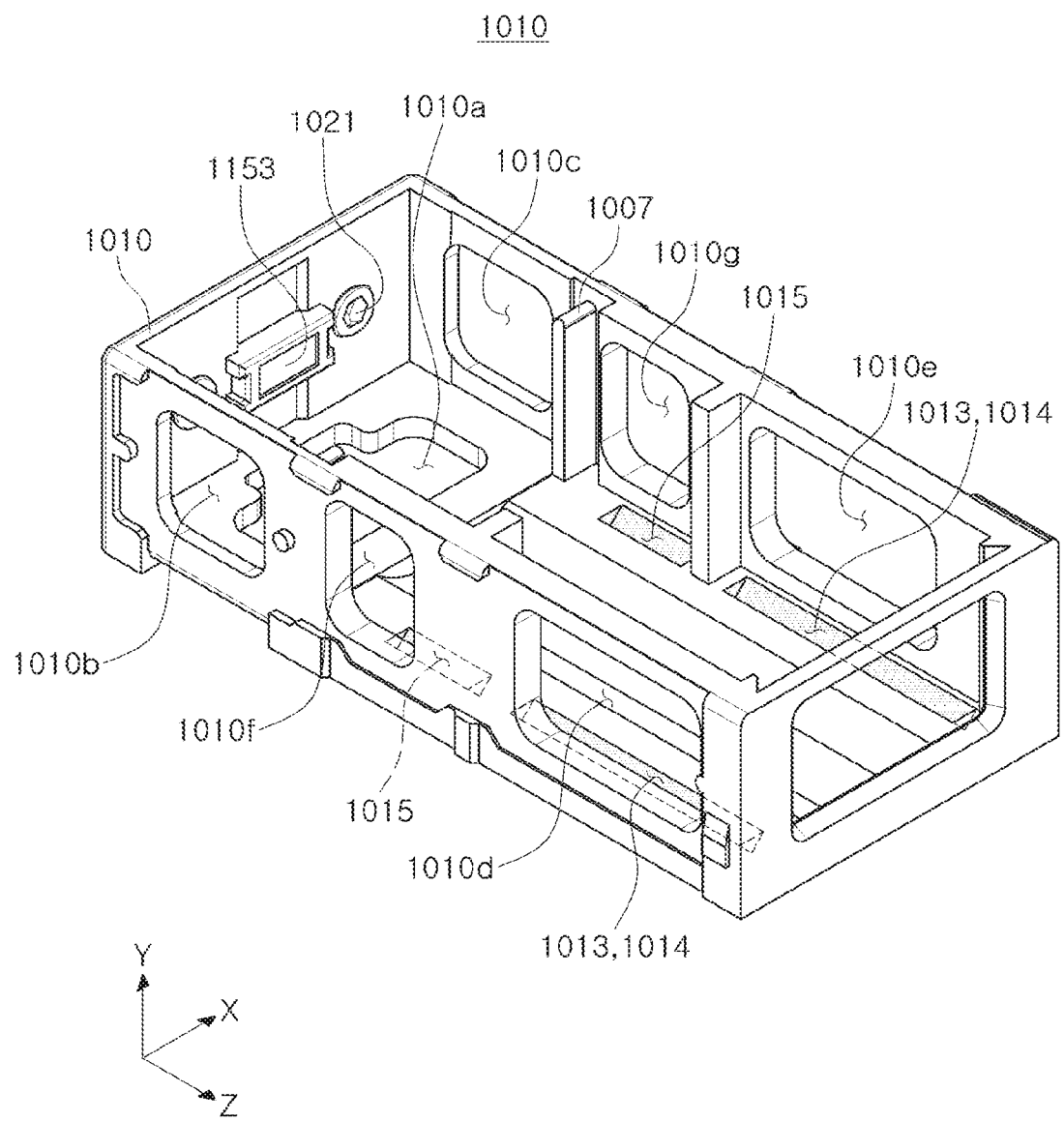
FIG. 5 is a perspective diagram illustrating a housing of a camera module according to an example.

FIG. 2 is a perspective diagram illustrating a camera module according to an example. FIGS. 3A and 3B are cross-sectional diagrams illustrating a camera module according to an example. FIG. 4 is an exploded perspective diagram illustrating a camera module according to an example.

Referring to FIGS. 2 to 4, a camera module 1000 may include a reflective module 1100, a lens module 1200, and an image sensor module 1300 provided in a housing 1010.

The reflective module 1100 may be configured to alter a moving direction of light. As an example, a moving direction of light incident through an opening 1031 (see FIG. 2) of a cover 1030 covering the camera module 1000 from an upper portion may be altered to a direction of the lens module 1200 by the reflective module 1100. To this end, the reflective module 1100 may include a reflective member 1110 reflecting light.

For example, a path of light incident in a thickness direction (Y axis direction) of the camera module 1000 may be altered to match an optical axis (Z axis) direction by the reflective member 1110.

The lens module 1200 may include a plurality of lenses, and the light of which a moving direction is altered by the reflective member 1110 may pass through the plurality of lenses. The lens module 1200 may also include a plurality of lens barrels 1210, 1220, and 1230. As the plurality of lens barrels 1210, 1220, and 1230 move in an optical axis (Z axis) direction, an AF function and a zoom function may be implemented.

The image sensor module 1300 may include an image sensor 1310 converting the light passing through the plurality of lenses into an electrical signal, and a printed circuit board 1320 on which the image sensor 1310 is mounted. The image sensor module 1300 may further include an optical filter 1340 filtering light passing through and incident from the lens module 1200. The optical filter 1340 may be implemented as an infrared shielding filter.

In an internal space of the housing 1010, the reflective module 1100 may be provided in a front region of the lens module 1200, and the image sensor module 1300 may be provided in a rear region of the lens module 1200.

Referring to FIGS. 2 to 9, the camera module 1000 may include the reflective module 1100, the lens module 1200, and the image sensor module 1300 provided in the housing 1010.

The reflective module 1100, the lens module 1200, and the image sensor module 1300 may be provided in the housing 1010 in order from one side to the other side. The housing 1010 may include an internal space in which the reflective module 1100, the lens module 1200, and the image sensor module 1300 are disposed (the printed circuit board 1320 including the image sensor module 1300 may be attached externally on the housing 1010).

For example, the housing 1010 may be provided in an integrated form to include both of the reflective module 1100 and the lens module 1200 in the internal space of the housing 1010. However, the configuration is not limited thereto. As an example, separate housings in which the reflective module 1100 and the lens module 1200 are disposed, respectively, may be interconnected with each other.

The housing 1010 may be covered by the cover 1030 such that the internal space of the housing 1010 may not be exposed.

The cover 1030 may include the opening 1031 through which light is incident, and a moving direction of light incident through the opening 1031 may be altered by the reflective module 1100, and the light may be incident to the lens module 1200. The cover 1030 may be provided in an integrated form to entirely cover the housing 1010, or separate cover members may be provided to separately cover the reflective module 1100 and the lens module 1200.

The reflective module 1100 may include the reflective member 1110 reflecting light. Light incident to the lens module 1200 may pass through a plurality of lens groups (included in the at least three lens barrels 1210, 1220, and 1230), may be converted into an electrical signal by the image sensor 1310, and may be stored.

The housing 1010 may include the reflective module 1100 and the lens module 1200 in the internal space of the housing 1010. Accordingly, the internal space of the housing 1010 may be divided into a space in which the reflective module 1100 is disposed and a space in which the lens module 1200 is disposed by a protruding wall 1007. The reflective module 1100 may be disposed on a front side from the protruding wall 1007, and the lens module 1200 may be disposed on a rear side from the protruding wall 1007. The protruding wall 1007 may be configured to protrude towards an internal space of the housing 1010 from a side wall on both sides of the housing 1010.

In the reflective module 1100 provided on the front side, a movable holder 1120 may be adhered to and supported by an internal wall of the housing 1010 by attractive force of a pulling yoke 1153 provided on the internal wall of the housing 1010 and a pulling magnet 1151 provided on the movable holder 1120. Alternately, although not illustrated, a pulling magnet may be provided in the housing 1010, and a pulling yoke may be provided in the movable holder 1120.

A first ball bearing 1131, a rotation plate 1130, and a second ball bearing 1133 may be provided between an internal wall of the housing 1010 and the movable holder 1120. The ball bearing may refer to a spherical ball member.

Accordingly, a first gap may be formed between the internal wall of the housing 1010 and the rotation plate 1130, and a second gap may be formed between the rotation plate 1130 and the movable holder 1120. The first ball bearing 1131 may be disposed in the first gap, and the second ball bearing 1133 may be disposed in the second gap. The first ball bearing 1131 and the second ball bearing 1133 may be partially inserted into and adhered to guide grooves 1132, 1134, 1021, and 1121.

In the example, a stopper 1050 having a hook shape configured to support the movable holder 1120 and to be inserted into the protruding wall 1007 may be provided (the movable holder 1120 may be fixed by attractive force applied by the pulling magnet 1151 and the pulling yoke 1153 even though the stopper 1050 is not provided). The stopper 1050 may be configured to have a hook shape, and a hook portion may be caught by an upper portion of the protruding wall 1007 and may oppose the movable holder 1120.

The housing 1010 may include a first driving portion 1140 and a second driving portion 1240 for driving the reflective module 1100 and the lens module 1200, respectively. The first driving portion 1140 may include a plurality of coils 1141b, 1143b, and 1145b for driving the reflective module 1100, and the second driving portion 1240 may include a plurality of coils 1241b, 1243b, and 1245b for driving the lens module 1200 configured as two or more lens modules 1200 and including the first lens barrel 1210, the second lens barrel 1220, and the third lens barrel 1230.

The plurality of coils 1141b, 1143b, 1145b, 1241b, 1243b, and 1245b may be mounted on a main substrate 1070 and the main substrate 1070 may be mounted in the housing 1010. Accordingly, the housing 1010 may include a plurality of through-holes 1010a, 1010b, 1010c, 1010d, 1010e, 1010f, and 1010g to expose the plurality of coils 1141b, 1143b, 1145b, 1241b, 1243b, and 1245b into an internal space of the housing 1010.

The main substrate 1070 on which the plurality of coils 1141b, 1143b, 1145b, 1241b, 1243b, and 1245b are mounted may be provided in an integrated form. In this case, one terminal may be provided, and external power and an external signal may thus be easily connected. However, the configuration is not limited thereto. A plurality of main substrates 1070 may be provided by separately providing a substrate on which coils for the reflective module 1100 are mounted and a substrate on which coils for the lens module 1200 are mounted.

The reflective module 1100 may alter a path of light incident through the opening 1031. When an object is imaged or a video is taken, an image or a video may be blurred by shaking of a user's hand, or for other reasons. In this case, the reflective module 1100 may calibrate the shaking of a user's hand by moving the movable holder 1120 on which the reflective module 1100 is mounted. For example, when an image or a video is blurred by shaking of a user's hand, the shaking may be compensated for by providing a relative displacement corresponding to the shaking to the movable holder 1120. The movable holder 1120 may be configured to move the reflective module 1100 in a first axis (X axis) direction perpendicular to an optical axis and in a second axis (Y axis) direction perpendicular to the first axis (X axis) direction. For example, the movable holder 1120 may rotate with reference to an axis in parallel to the first axis (X axis) or the second axis (Y axis) or may directly move in the first axis (X axis) direction or the second axis (Y axis) direction such that the movable holder 1120 may move the reflective module 1100 provided in the movable holder 1120. An example in which the movable holder 1120 rotates with reference to an axis in parallel to the first axis (X axis) or the second axis (Y axis), but the configuration is not limited thereto. The movable holder 1120 may also move in the first axis (X axis) direction or the second axis (Y axis) direction.

An OIS function may be implemented by moving the movable holder 1120 having a relatively light weight, thereby significantly reducing power consumption.

An OIS function, a moving direction of light may be altered by moving the movable holder 1120 including the reflective module 1100 rather than moving a lens barrel or an image sensor including a plurality of lenses such that calibrated light in which the handshaking, and the like, are calibrated may be incident to the lens module 1200.

The reflective module 1100 may include the movable holder 1120 provided in and supported by the housing 1010, the reflective module 1100 mounted on the movable holder 1120, and the driving portion 1140 moving the movable holder 1120.

The reflective module 1100 may alter a moving direction of light. For example, the reflective module 1100 may be implemented as a mirror or a prism reflecting light (for ease of description, in the diagram, the reflective module 1100 may be implemented as a prism).

The reflective module 1100 may be fixed to the movable holder 1120. The movable holder 1120 may include a mounting surface 1122 on which the reflective module 1100 is mounted.

The mounting surface 1122 of the movable holder 1120 may be configured to be an inclined surface to alter a path of light. For example, the mounting surface 1122 may be configured as an inclined surface inclined by 30 to 60 degrees with reference to an optical axis (Z axis) of a plurality of lenses. The inclined surface of the movable holder 1120 may be directed to the opening 1031 of the cover 1030 through which light is incident.

The movable holder 1120 on which the reflective member 1110 is mounted may be moveably accommodated in an internal space of the housing 1010. For example, the movable holder 1120 may be accommodated in the housing 1010 and may rotate with reference to a first axis (X axis) and a second axis (Y axis). The first axis (X axis) and the second axis (Y axis) may be axes perpendicular to the optical axis (Z axis), and the first axis (X axis) and the second axis (Y axis) may be perpendicular to each other.

The movable holder 1120 may be supported by the housing 1010 by at least two first ball bearings 1131 aligned along the first axis (X axis) and at least two second ball bearings 1133 aligned along the second axis (Y axis) to smoothly rotate to the first axis (X axis) and the second axis (Y axis). As an example, two first ball bearings 1131 aligned along the first axis (X axis) and two second ball bearings 1133 aligned along the second axis (Y axis) may be provided. The movable holder 1120 may rotate with reference to the first axis (X axis) and a second axis (Y axis) by the first driving portion 1140.

The first ball bearings 1131 and the second ball bearings 1133 may be provided on a front surface and a rear surface of the rotation plate 1130, respectively (alternately, the first ball bearings 1131 and the second ball bearings 1133 may be provided on a rear surface and a front surface of the rotation plate 1130, respectively, and accordingly, the first ball bearings 1131 may be aligned along the second axis (Y axis) and the second ball bearings 1133 may be aligned along the first axis (X axis); in the description below, the example illustrated in the diagram will be described for ease of description), and the rotation plate 1130 may be provided between the movable holder 1120 and an internal side surface of the housing 1010.

The movable holder 1120 may be supported by the housing 1010 by the rotation plate 1130 due to attractive force of the pulling magnet 1151 provided in the movable holder 1120, or a pulling yoke, and of the pulling yoke 1153 provided in the housing 1010, or a pulling magnet (also, the first ball bearings 1131 and the second ball bearings 1133 may be provided between the movable holder 1120 and the housing 1010).

Guide grooves 1132 and 1134 may be provided on a front surface and a rear surface of the rotation plate 1130, and the first ball bearing 1131 and the second ball bearing 1133 may be inserted into the guide grooves 1132 and 1134. The guide grooves 1132 and 1134 may include the first guide groove 1132 into which the first ball bearing 1131 is partially inserted and the second guide groove 1134 into which the second ball bearing 1133 is partially inserted.

A third guide groove 1021 may be provided in the housing 1010, and the first ball bearing 1131 may be partially inserted into the third guide groove 1021. A fourth guide groove 1121 may be provided in the movable holder 1120, and the second ball bearing 1133 may be partially inserted into the fourth guide groove 1121.

Figure 10A:
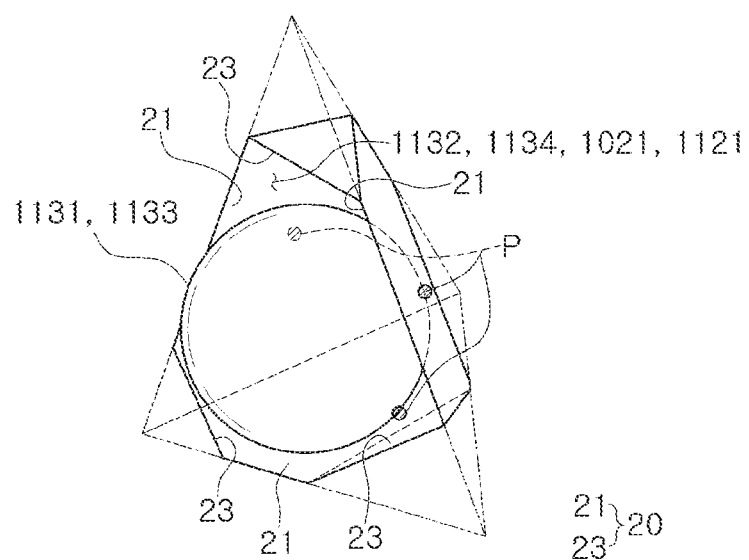
FIG. 10A is a perspective diagram illustrating an example configuration in which a ball bearing is inserted into a guide groove according to an example.
Figure 10B:
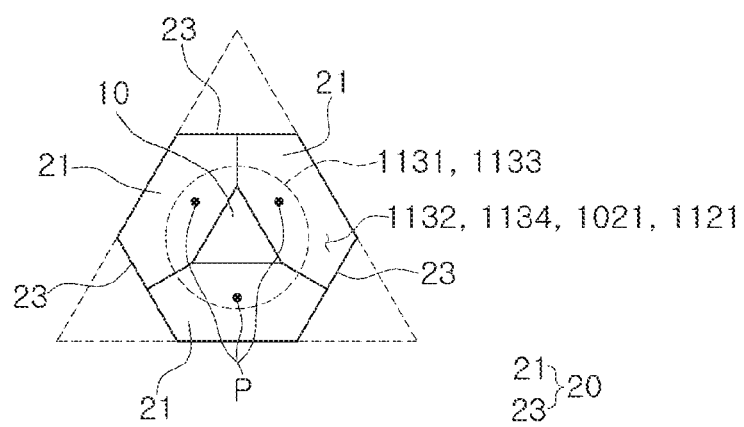
FIG. 10B is a plan diagram illustrating an example configuration in which a ball bearing is inserted into a guide groove according to an example.
Figure 11:
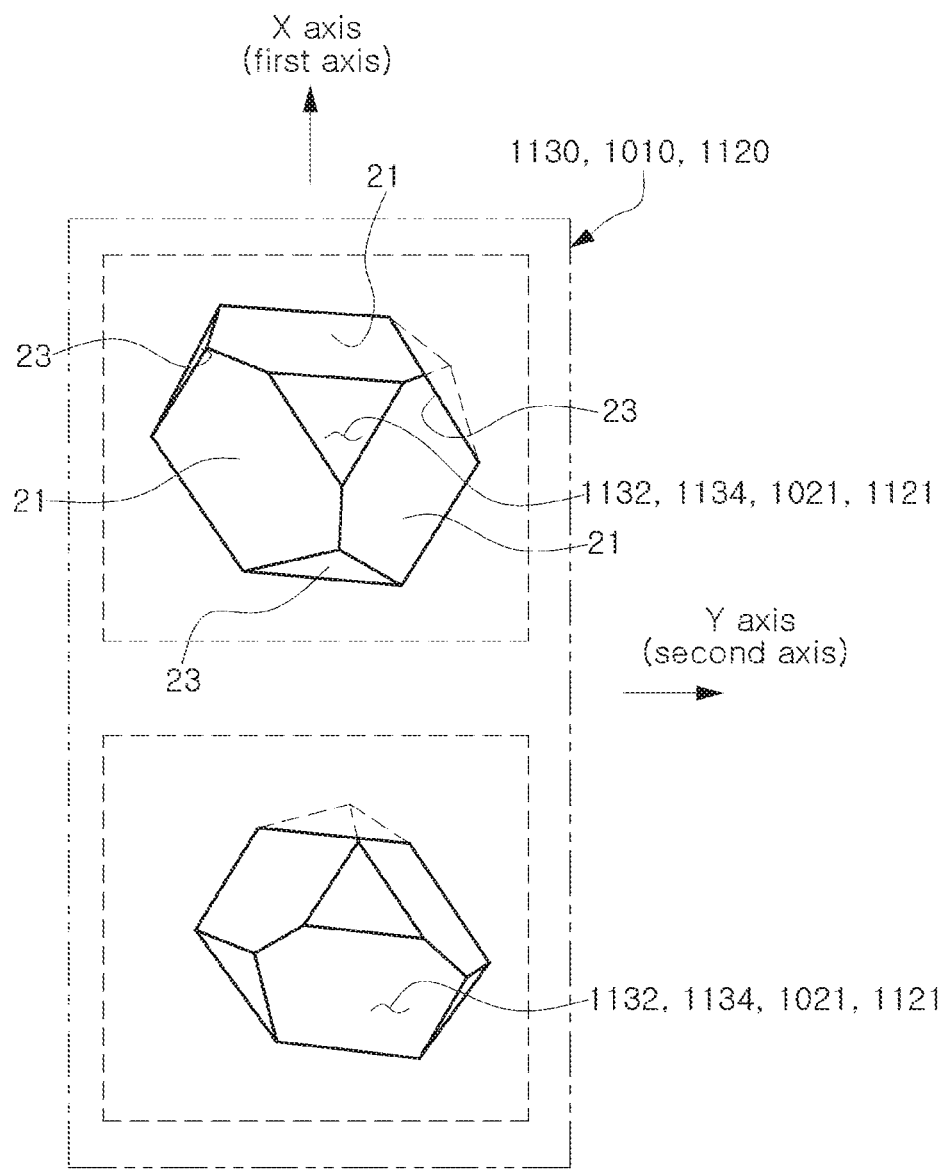
FIG. 11 is a perspective diagram illustrating a pair of guide grooves provided in each of members according to an example.

Referring to FIGS. 10A, 10B, and 11, the first ball bearings 1131 or the second ball bearings 1133 may be inserted into the first guide groove 1132, the second guide groove 1134, the third guide groove 1021, and the fourth guide groove 1121.

To maintain an accurate position of the ball bearing inserted into the guide groove within the guide groove, the ball bearing may be in contact with and supported by the guide groove at only three points P, and the supported state may be maintained. When the ball bearing is in contact with the guide groove at four or more points, the ball bearing may be in contact with the guide groove at only three points and may be inclined to one side when the ball bearing rotates depending on a manufacturing tolerance or a driving state of the guide groove or the ball bearing. Accordingly, it may be difficult to maintain an accurate relative position between the rotation plate 1130 and the movable holder 1120, or between the rotation plate 1130 and the housing 1010.

To this end, each of the first to fourth guide grooves 1132, 1134, 1021, and 1121 may have a shape formed by cutting corners of a triangular pyramid shape (four-sided).

The first to fourth guide grooves 1132, 1134, 1021, and 1121 may include three first surfaces 21 such that the ball bearings 1131 and 1133, each having a spherical shape, may be supported by internal side surfaces of the guide grooves 1132, 1134, 1021, and 1121 at only three points P. Accordingly, the three contact points P between the ball bearings 1131 and 1133 and the first to fourth guide grooves 1132, 1134, 1021, and 1121 may be formed on the first surfaces 21.

The first surfaces 21 may be portions of the side surfaces 20, and the side surfaces 20 may include the first surfaces 21, and a second surface 23 disposed between the first surfaces 21 (disposed adjacent to two of the first surfaces 21) and not in contact with the ball bearings 1131 and 1133.

When the three side surfaces (the first surfaces 21) in contact with the ball bearings 1131 and 1133 at the points are extended, a triangular pyramid (four-sided) may be formed. Lines formed by extending the three side surfaces in contact with the ball bearings 1131 and 1133 at the points may form edges of the triangular pyramid (four-sided). The triangular pyramid implemented by extending the three side surfaces may be an equilateral triangular pyramid.

Each of the guide grooves 1132, 1134, 1021, and 1121 may have a shape formed by cutting corners of the triangular pyramid (four-sided).

A portion of the triangular pyramid formed by cutting an internal corner of the guide groove may form a bottom 10 of the guide grooves 1132, 1134, 1021, and 1121, and portions formed by cutting the other three corners of the opening of the guide groove may form the second surface 23 of the side surfaces 20 not in contact with the ball bearings 1131 and 1133.

As the bottom 10 and the second surface 23 are formed by cutting corners of the triangular pyramid, each of the bottom 10 and the second surface 23 may have a triangular shape, and the ball bearings 1131 and 1133 may not be in contact with the bottom 10 and the second surface 23. The openings of the first to fourth guide grooves 1132, 1134, 1021, and 1121 may be formed by cutting all the corners of the triangular-shaped bottom of the triangular pyramid (four-sided), and each of the openings may thus have a hexagonal shape.

Each of bottoms of the first to fourth guide grooves 1132, 1134, 1021, and 1121 may have a triangular shape, and two ball bearings may be provided in a first gap between the housing 1010 and the rotation plate 1130 and in a second gap between the rotation plate 1130 and the movable holder 1120.

In this case, the number of each of the first to fourth guide grooves 1132, 1134, 1021, and 1121 may be configured as two, and a pair of grooves of each of the first to fourth guide grooves 1132, 1134, 1021, and 1121 provided in the housing 1010, on a front surface and a rear surface of the rotation plate 1130, and in the movable holder 1120 may have the same shape, and a pair of the grooves may be configured to be symmetrical to each other with reference to an optical axis. In other words, when the ball bearings are aligned in the first axis (X axis) direction, the guide grooves may be configured to be symmetrical to each other with reference to a line in parallel to the second axis (Y axis) direction perpendicular to the optical axis and the first axis (X axis) (see FIG. 11).

The first ball bearing 1131 and the second ball bearing 1133 may slide in the first guide groove 1132, the second guide groove 1134, the third guide groove 1021, and the fourth guide groove 1121, and may work as bearings.

The first driving portion 1140 may produce driving force for the movable holder 1120 to rotate with reference to two axes.

As an example, the first driving portion 1140 may include a plurality of magnets 1141a, 1143a, and 1145a, and the plurality of coils 1141b, 1143b, and 1145b opposing the plurality of magnets 1141a, 1143a, and 1145a.

When power is applied to the plurality of coils 1141b, 1143b, and 1145b, the movable holder 1120, on which the plurality of magnets 1141a, 1143a, and 1145a may be mounted, may rotate with reference to the first axis (X axis) and the second axis (Y axis) by electromagnetic force produced between the plurality of magnets 1141a, 1143a, and 1145a and the plurality of coils 1141b, 1143b, and 1145b.

The plurality of magnets 1141a, 1143a, and 1145a may be mounted on the movable holder 1120. As an example, the magnet 1141a may be mounted on a lower surface of the movable holder 1120, and the magnets 1143a and 1145a may be mounted on side surfaces of the movable holder 1120.

The plurality of coils 1141b, 1143b, and 1145b may be mounted on the housing 1010. As an example, the plurality of coils 1141b, 1143b, and 1145b may be mounted on the housing 1010 by the main substrate 1070. The plurality of coils 1141b, 1143b, and 1145b may be provided on the main substrate 1070, and the main substrate 1070 may be mounted on the housing 1010.

A closed-loop control method of sensing a position of the movable holder 1120 and providing feedback of the sensing when the movable holder 1120 rotates may be used.

Accordingly, to perform the closed-loop control, position sensors 1141c and 1143c may be provided. The position sensors 1141c and 1143c may be implemented by hall-sensors.

The position sensors 1141c and 1143c may be disposed in internal regions or external regions of the coils 1141b and 1143b, respectively, and the position sensors 1141c and 1143c may be mounted on the main substrate 1070 on which the coils 1141b and 1143b are mounted.

A gyro sensor (not illustrated) sensing a factor of shaking such as shaking of a user's hand may be provided on the main substrate 1070, and a driving circuit device (a driver IC; not illustrated) providing a driving signal to the plurality of coils 1141b, 1143b, and 1145b may be provided on the main substrate 1070.

When the movable holder 1120 rotates with reference to the first axis (X axis), the rotation plate 1130 may rotate while being mounted on the first ball bearing 1131 in which the ball bearings are aligned along the first axis (X axis), and the movable holder 1120 may also rotate (in this case, the movable holder 1120 may not relatively move with respect to the rotation plate 1130).

When the movable holder 1120 rotates with reference to the second axis (Y axis), the movable holder 1120 may rotate while being mounted on the second ball bearing 1133 in which the ball bearings are aligned along the second axis (Y axis) (in this case, the rotation plate 1130 may not rotate such that the movable holder 1120 may relatively move with respect to the rotation plate 1130).

Thus, when the movable holder 1120 rotates with reference to the first axis (X axis), the first ball bearing 1131 may be applied, and when the movable holder 1120 rotates with reference to the second axis (Y axis), the second ball bearing 1133 may be applied. That is because, when the movable holder 1120 rotates with reference to the first axis (X axis), the second ball bearings 1133 aligned with reference to the second axis (Y axis) and inserted into the guide grooves may not be able to move, and when the movable holder 1120 rotates with reference to the second axis (Y axis), the first ball bearings 1131 aligned with reference to the first axis (X axis) and inserted into the guide grooves may not be able to move.

Light reflected from the reflective module 1100 may be incident to the lens module 1200. An AF function or a zoom function may be implemented by movement of the at least three lens barrels 1210, 1220, and 1230 provided in the lens module 1200 in an optical axis (Z axis) with respect to the incident light.

Figure 6A:
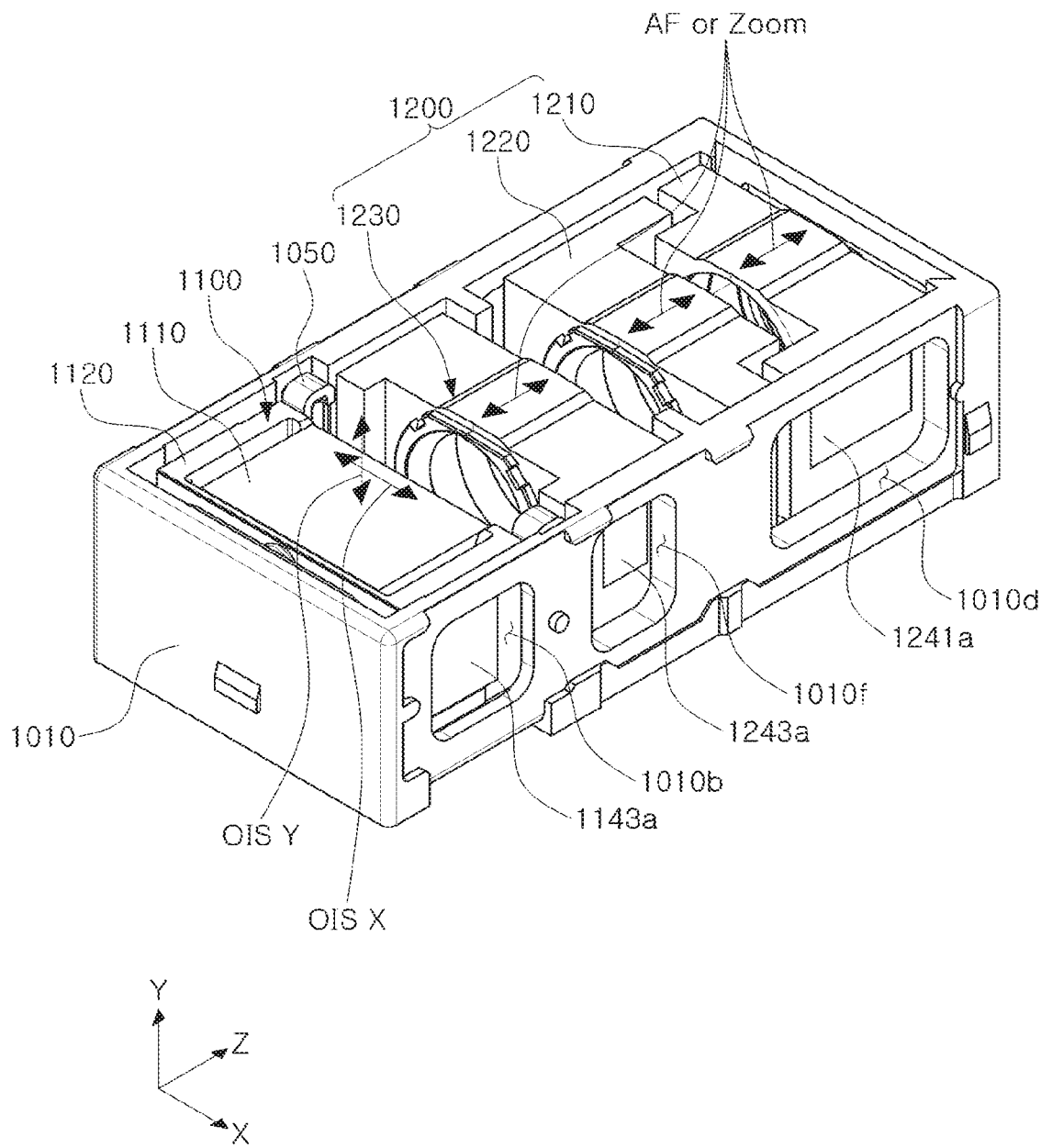
FIG. 6A is a perspective diagram illustrating an example configuration in which a reflective module and a lens module are combined to a housing of a camera module according to an example.
Figure 6B:
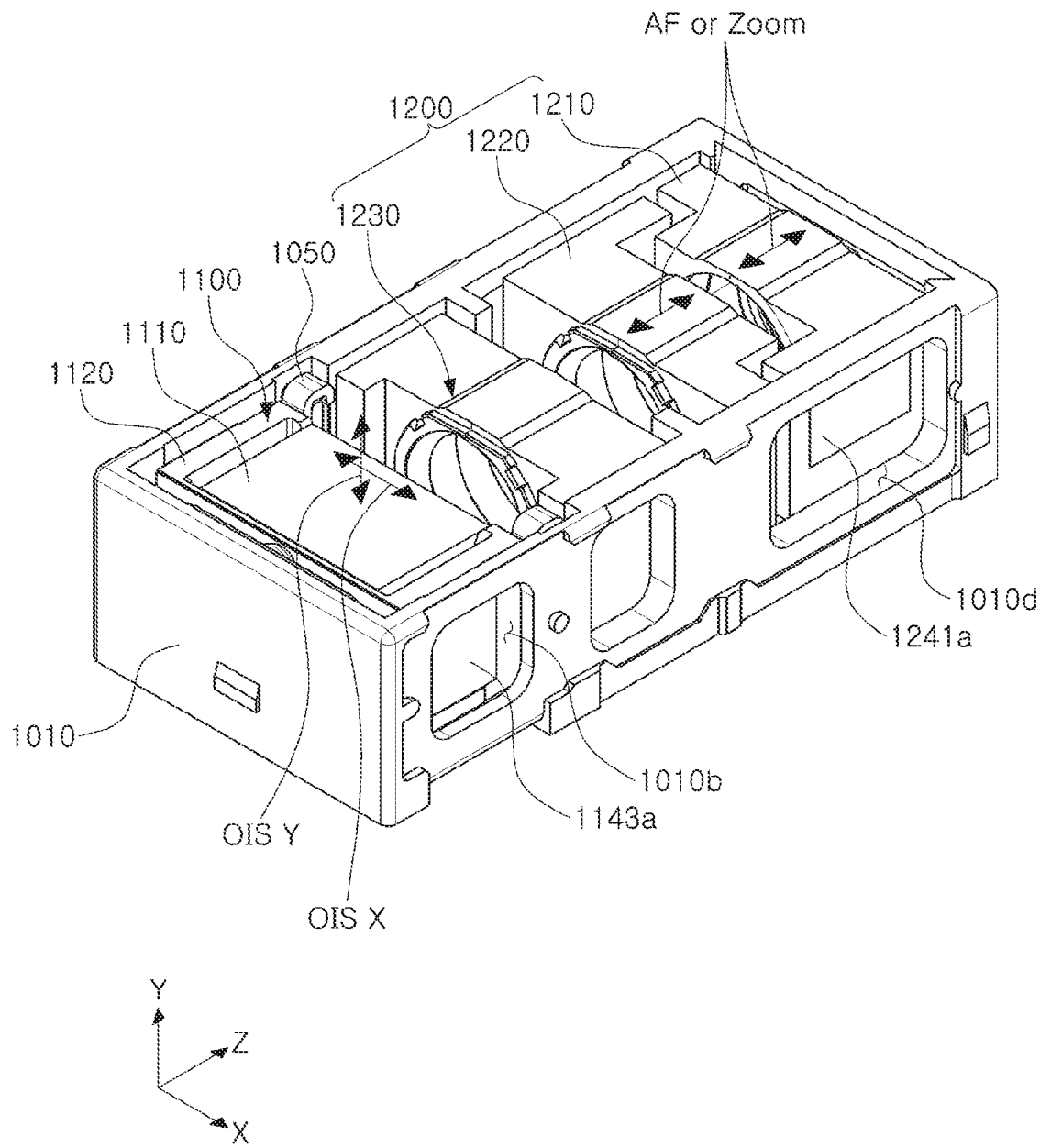
FIG. 6B is a perspective diagram illustrating an example configuration in which a reflective module and a lens module are combined to a housing of a camera module according to an example.
Figure 7:
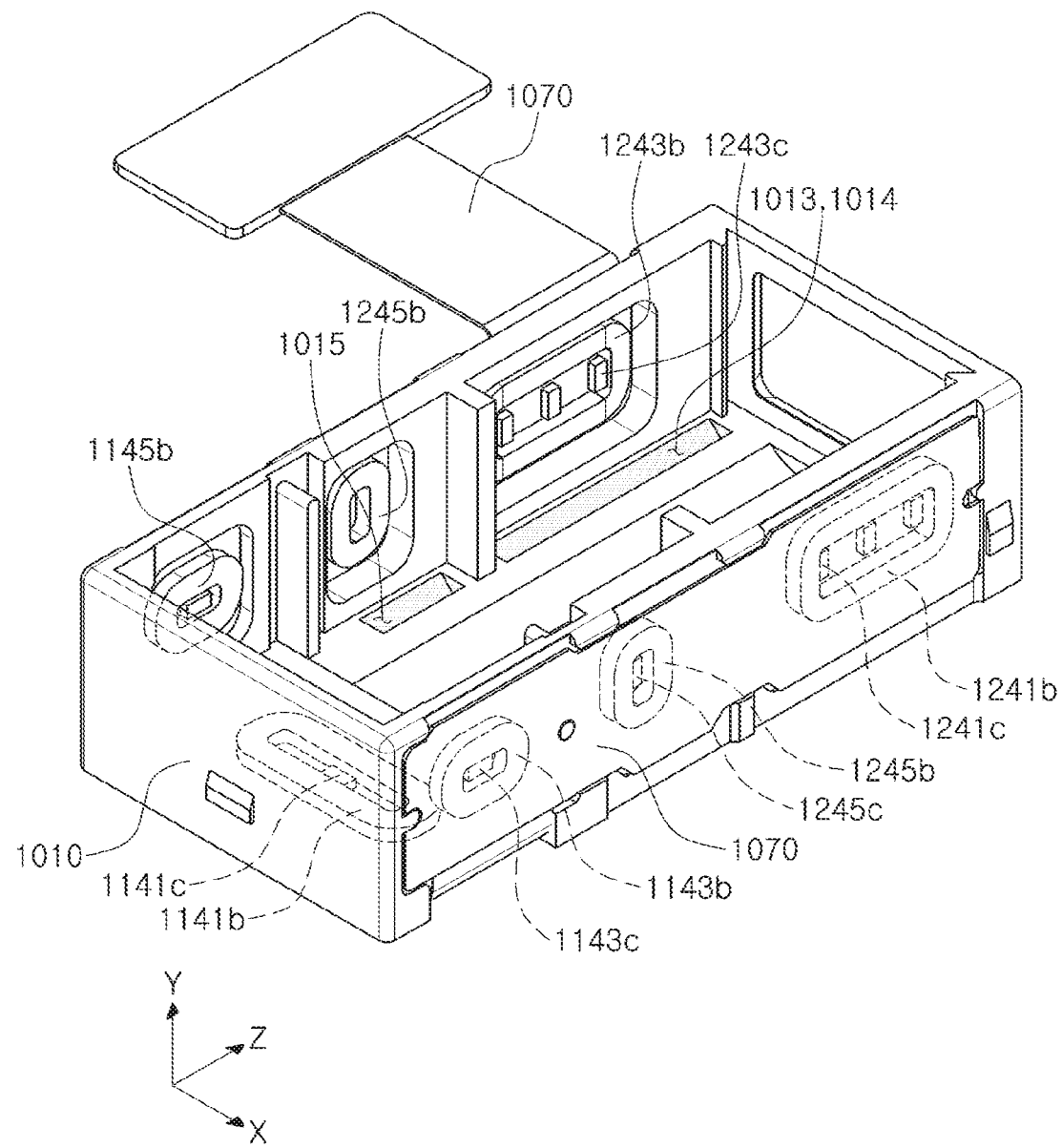
FIG. 7 is a perspective diagram illustrating an example configuration in which a substrate on which a driving coil and a sensor are mounted is combined to a housing of a camera module according to an example.
Figure 8:
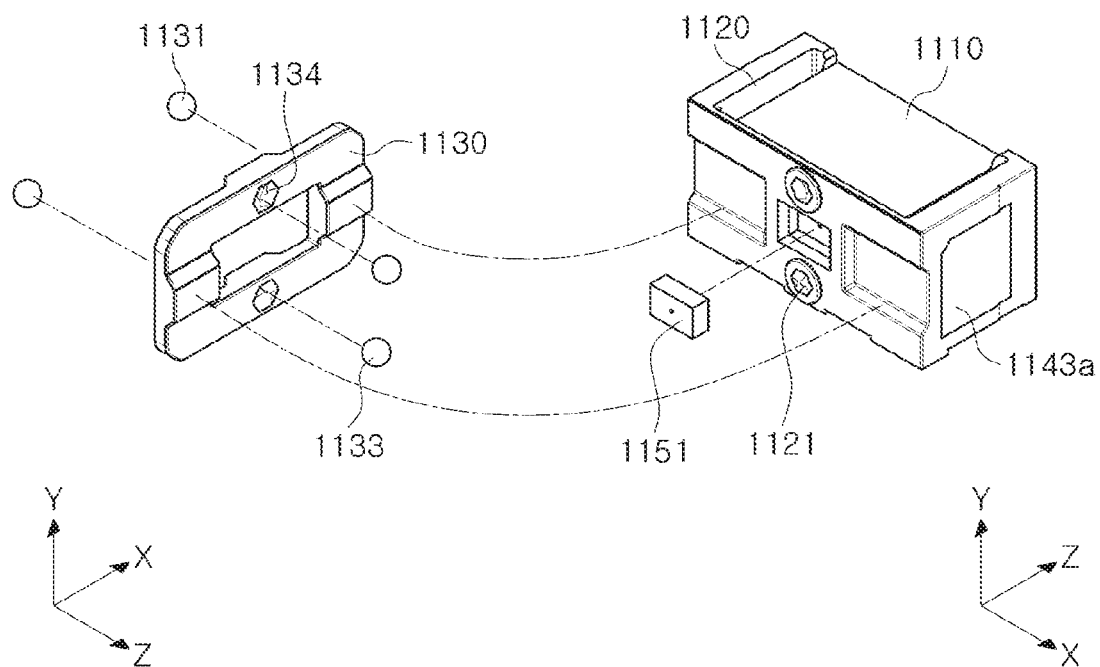
FIG. 8 is an exploded perspective diagram illustrating a rotation plate and a movable holder of a camera module according to an example.
Figure 9:
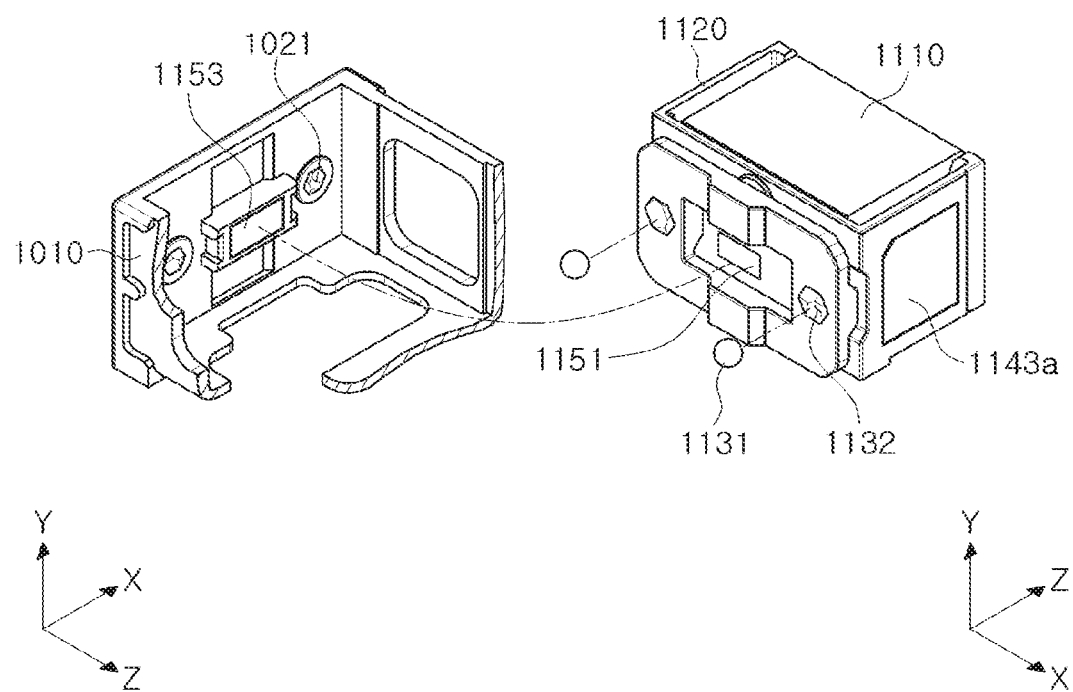
FIG. 9 is an exploded perspective diagram illustrating a housing and a movable holder in a camera module according to an example.

According to the example illustrated in FIG. 6A, two lens barrels 1210 and 1220 disposed in the rear region may perform a zoom function, and one lens barrel 1230 disposed in a front region may perform an AF function. Portions of or all of the three lens barrels 1210, 1220, and 1230 may perform a zoom function or an AF function.

In addition to the configuration described above, the lens barrels may be controlled in various other manners. For example, according to the example illustrated in FIG. 6B, both of two lens barrels 1210 and 1220 disposed in a rear region may perform a zoom function or an AF function, that is, both of the two lens barrels 1210 and 1220 may perform a zoom function, and the rearmost lens barrel 1210 may additionally perform an AF function, and the lens barrel 1230 disposed in the front region may be fixed to the housing 1010 and may maintain the fixed state. Further, although not illustrated, one of the three lens barrels 1210, 1220, and 1230 may be fixed to the housing 1010 and may maintain the fixed state, and the other two lens barrels may perform a zoom function or an AF function individually or both of the other two lens barrels may perform a zoom function or an AF function. In this case, the lens barrel (e.g., the lens barrel 1230) fixed to the housing 1010 may not be provided with a ball bearing, and the like, interposed between a driving magnet or a coil opposing the driving magnet and the housing 1010.

A space in which the lens barrel 1230 in the front region is disposed and a space in which the two lens barrels 1210 and 1220 in the rear region are disposed may be divided from each other, but the configuration is not limited thereto. The three lens barrels 1210, 1220, and 1230 may be provided in the same space, or may be provided in different spaces divided from each other.

A plurality of stacked lens groups provided in the lens module 1200 may be divided and provided in different lens barrels among the three lens barrels 1210, 1220, and 1230. Even when the plurality of stacked lens groups is divided and provided in different lens barrels among the at least three lens barrels 1210, 1220, and 1230, an optical axis may be aligned in a Z axis direction in which light is emitted from the reflective module 1100.

The lens module 1200 may include the second driving portion 1240 to implement an AF function and a zoom function.

The lens module 1200 may include at least three lens barrels, the first lens barrel 1210, the second lens barrel 1220, and the third lens barrel 1230, provided in an internal space of the housing 1010 and moving in the optical axis (Z axis). The lens module 1200 may also include the second driving portion 1240 moving the three lens barrels 1210, 1220, and 1230 in the optical axis (Z axis) with respect to the housing 1010.

The first to third lens barrels 1210, 1220, and 1230 may be configured to move in the optical axis (Z axis) to implement an AF function or a zoom function.

Accordingly, the second driving portion 1240 may produce driving force for the first to third lens barrels 1210, 1220, and 1230 to move in the optical axis (Z axis). Accordingly, the second driving portion 1240 may individually move the first to third lens barrels 1210, 1220, and 1230 in the optical axis (Z axis) to implement an AF function or a zoom function.

The first to third lens barrels 1210, 1220, and 1230 may be provided on and supported by a bottom surface of the housing 1010. For example, the first to third lens barrels 1210, 1220, and 1230 may be individually supported by the bottom surface of the housing 1010 by ball bearings. In the description below, an example in which the first to third lens barrels 1210, 1220, and 1230 are individually supported by the bottom surface of the housing 1010 by means of ball bearings will be described.

As an example, the second driving portion 1240 may include a plurality of magnets 1241a, 1243a, and 1245a and the plurality of coils 1241b, 1243b, and 1245b opposing the plurality of magnets 1241a, 1243a, and 1245a.

When power is applied to the plurality of coils 1241b, 1243b, and 1245b, the plurality of magnets 1241a, 1243a, and 1245a may move the first to third lens barrels 1210, 1220, and 1230, divided and disposed in different positions, in the optical axis (Z axis) direction by electromagnetic force produced between the plurality of magnets 1241a, 1243a, and 1245a and the plurality of coils 1241b, 1243b, and 1245b.

The plurality of magnets 1241a, 1243a, and 1245a may be divided and mounted on different lens barrels among the first to third lens barrels 1210, 1220, and 1230. As an example, the first magnet 1241a may be mounted on a side surface of the first lens barrel 1210, the second magnet 1243a may be mounted on a side surface of the second lens barrel 1220, and the third magnet 1245a may be mounted on a side surface of the third lens barrel 1230.

The plurality of coils 1241b, 1243b, and 1245b may be mounted on the housing 1010 and may oppose the plurality of magnets 1241a, 1243a, and 1245a. The plurality of magnets 1241a, 1243a, and 1245a provided in the first to third lens barrels 1210, 1220, and 1230 may be divided and disposed on different surfaces between both side surfaces, and accordingly, the plurality of coils 1241b, 1243b, and 1245b may also be divided and disposed on different surfaces between both side surfaces of the housing 1010.

As an example, the plurality of coils 1241b, 1243b, and 1245b may be mounted on the main substrate 1070 and the main substrate 1070 may be mounted on the housing 1010.

A closed-loop control method of sensing positions of the first to third lens barrels 1210, 1220, and 1230 and providing a feedback of the sensing when the first to third lens barrels 1210, 1220, and 1230 move may be used. Accordingly, to perform the closed loop control method, position sensors 1241c, 1243c, and 1245c may be provided. The position sensors 1241c, 1243c, and 1245c may be hall sensors.

The position sensors 1241c, 1243c, and 1245c may be disposed internally of or externally of the coils 1241b, 1243b, and 1245b, and the position sensors 1241c, 1243c, and 1245c may be mounted on the main substrate 1070 on which the coils 1241b, 1243b, and 1245b are mounted.

The first lens barrel 1210 and the second lens barrel 1220 may be configured to be driven by a pair of a coil and a magnet, and in this case, the coil and the magnet may be disposed on one side. To enhance driving force, the coil and the magnet may be configured to have relatively large sizes, and in this case, to accurately sense the positions, the plurality of position sensors 1241c and 1243c may be provided. Three position sensors 1241c and 1243c may be provided in the coils 1241b and 1243b driving the first lens barrel 1210 and the second lens barrel 1220.

The first lens barrel 1210 may be provided in the housing 1010 and may move in the optical axis (Z axis) direction. As an example, a plurality of third ball bearings 1215 may be disposed between the first lens barrel 1210 and a bottom surface of the housing 1010.

The third ball bearings 1215 may work as bearings which guide movement of the first lens barrel 1210 while an AF function and a zoom function are implemented.

The third ball bearings 1215 may be configured to roll in the optical axis (Z axis) direction when driving force moving the first lens barrel 1210 in the optical axis (Z axis) direction is provided. Accordingly, the third ball bearings 1215 may guide the movement of the first lens barrel 1210 in the optical axis (Z axis) direction.

A plurality of guide grooves 1214 and 1013 in which the ball bearings 1215 are accommodated, respectively, may be disposed on the bottom surface of the housing 1010 opposing the first lens barrel 1210, and a portion of the plurality of guide grooves 1214 and 1013 may be configured to be elongated in the optical axis (Z axis) direction.

The third ball bearings 1215 may be accommodated in the guide grooves 1214 and 1013 and may be interposed between the first lens barrel 1210 and the housing 1010.

A portion or all of the plurality of guide grooves 1214 and 1013 may be configured to be elongated in the optical axis (Z axis) direction. A cross-sectional surface of each of the guide grooves 1214 and 1013 may be configured to have a rounded shape, a polygonal shape, or the like.

The first lens barrel 1210 may be pressured towards the bottom surface of the housing 1010 such that the third ball bearings 1215 may maintain a contact state with the first lens barrel 1210 and the housing 1010. To this end, a pulling yoke (not illustrated) opposing a pulling magnet (not illustrated) mounted on a lower surface of the first lens barrel 1210 may be mounted on the bottom surface of the housing 1010. The pulling magnet may be formed of a magnetic material. Alternatively, the pulling magnet may be mounted on the bottom surface of the housing 1010, and the pulling yoke may be mounted on the lower surface of the first lens barrel 1210.

The first lens barrel 1210 may be provided in the housing 1010 and may move in the optical axis (Z axis) direction. As an example, the second lens barrel 1220 may be disposed in a front region of the first lens barrel 1210 and may be disposed in parallel to the first lens barrel 1210 in the optical axis direction.

A plurality of fourth ball bearings 1225 may be provided between the second lens barrel 1220 and the bottom surface of the housing 1010, and the second lens barrel 1220 may slide or roll with respect to the housing 1010 by the ball bearings 1225.

The fourth ball bearings 1225 may support the rolling or sliding of the second lens barrel 1220 in the optical axis (Z axis) direction when driving force moving the second lens barrel 1220 in the optical axis (Z axis) direction is produced.

A plurality of guide grooves 1224 and 1014 in which the fourth ball bearings 1225 are accommodated may be formed on the bottom surface of the housing 1010 on which the second lens barrel 1220 and the housing 1010 oppose each other, and a portion of the guide grooves 1224 and 1014 may be configured to be elongated in the optical axis (Z axis) direction.

The fourth ball bearings 1225 may be accommodated in the guide grooves 1224 and 1014 and may be interposed between the second lens barrel 1220 and the housing 1010.

Each of the plurality of guide grooves 1224 and 1014 may be configured to be elongated in the optical axis (Z axis) direction. A cross-sectional surface of each of the plurality of guide grooves 1224 and 1014 may have a rounded shape, a polygonal shape, and the like.

The second lens barrel 1220 may be pressured towards the bottom surface of the housing 1010 such that the fourth ball bearings 1225 may maintain a contact state with the second lens barrel 1220 and the housing 1010.

To this end, a pulling yoke (not illustrated) opposing a pulling magnet (not illustrated) mounted on the second lens barrel 1220 may be mounted on the bottom surface of the housing 1010. The pulling magnet may be formed of a magnetic material. Alternatively, the pulling magnet may be mounted on the bottom surface of the housing 1010, and the pulling yoke may be mounted on a lower surface of the second lens barrel 1220.

The third lens barrel 1230 may be provided in the housing 1010 and may move in the optical axis (Z axis) direction. As an example, the third lens barrel 1230 may be disposed in a front region of the second lens barrel 1220 and may be disposed in parallel to the second lens barrel 1220 in the optical axis (Z axis) direction.

A plurality of fifth ball bearings 1235 may be disposed between the third lens barrel 1230 and the bottom surface of the housing 1010, and the third lens barrel 1230 may slide or roll with reference to the housing 1010 by the fifth ball bearings 1235.

The fifth ball bearings 1235 may be configured to support the rolling or the sliding of the third lens barrel 1230 in the optical axis (Z axis) direction when driving force moving the third lens barrel 1230 in the optical axis (Z axis) direction is produced.

A plurality of guide grooves 1234 and 1015 in which the fifth ball bearings 1235 are accommodated may be formed on the bottom surface of the housing 1010 on which the third lens barrel 1230 and the housing 1010 oppose each other, and a portion of the plurality of guide grooves 1234 and 1015 may be configured to be elongated in the optical axis (Z axis) direction.

The fifth ball bearings 1235 may be accommodated in the guide grooves 1234 and 1015 and may be interposed between the third lens barrel 1230 and the housing 1010.

The plurality of guide grooves 1234 and 1015 may be configured to be elongated in the optical axis (Z axis) direction. A cross-sectional surface of each of the plurality of guide grooves 1234 and 1015 may have a rounded shape, a polygonal shape, and the like.

The third lens barrel 1230 may be pressured towards the bottom surface of the housing 1010 such that the fifth ball bearings 1235 may maintain a contact state with the third lens barrel 1230 and the housing 1010.

To this end, a pulling yoke (not illustrated) opposing a pulling magnet (not illustrated) mounted on the third lens barrel 1230 may be mounted on the bottom surface of the housing 1010. The pulling magnet may be formed of a magnetic material. Alternatively, the pulling magnet may be mounted on the bottom surface of the housing 1010, and the pulling yoke may be mounted on a lower surface of the third lens barrel 1230.

The guide grooves 1214, 1013, 1014, and 1015 provided in the housing 1010 and guiding movement of the third to fifth ball bearings 1215, 1225, and 1235 may be configured to be elongated in the optical axis direction, or at least two of the guide grooves 1214, 1013, 1014, and 1015 may be interconnected with each other. When at least two of the three guide grooves 1214, 1013, 1014, and 1015 are interconnected with each other, the first to third lens barrels 1210, 1220, and 1230 may be easily aligned in the optical axis direction.

The guide grooves 1013 and 1014 provided in a moving path of the first and second lens barrels 1210 and 1220 may be connected to each other as one groove, and the third lens barrel 1230 may be provided separately. However, the configuration is not limited thereto. For example, the guide grooves 1014 and 1015 used for moving the second and third lens barrels 1220 and 1230 may be configured to be connected to each other as one groove, or all the guide grooves 1013, 1014, and 1015 may be configured to be connected to each other.

The first to third lens barrels 1210, 1220, and 1230 may be provided in order in the optical axis direction, and the first and second lens barrels 1210 and 1220 may include coils 1241b and 1243b and magnets 1241a and 1243a on one side or the other side of the first and second lens barrels 1210 and 1220, respectively. The third lens barrel 1230 may include a coil 1245b and a 1245a on both sides of the third lens barrel 1230.

Figure 12:
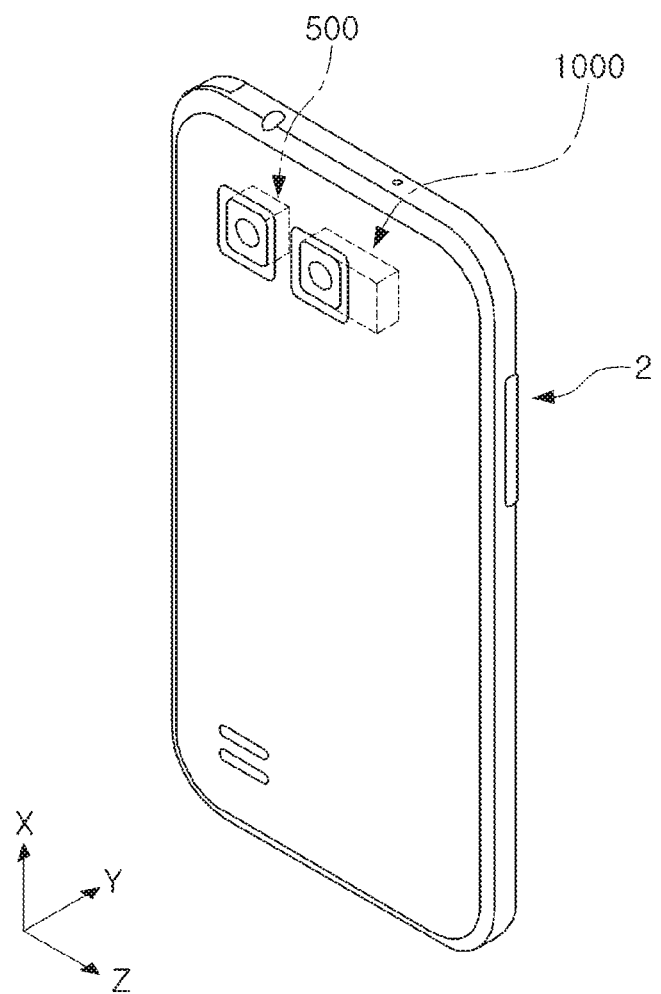
FIG. 12 is a perspective diagram illustrating a portable electronic device according to another example.

FIG. 12 is a perspective diagram illustrating a portable electronic device according to another example.

Referring to FIG. 12, a portable electronic device 2 may be implemented as a portable electronic device such as a mobile communication terminal device, a smartphone, a table PC, and the like, on which a plurality of camera modules 500 and 1000 are mounted.

The plurality of camera modules 500 and 1000 may be mounted on the portable electronic device 2.

At least one of the plurality of camera modules 500 and 1000 may be implemented by the camera module 1000 described in the aforementioned examples described with reference to FIGS. 2 to 11.

In the case of a portable electronic device including a dual camera module, at least one of the two camera modules may be implemented by the camera module 1000 described in the aforementioned examples.

The camera module and the portable electronic device including the camera module may implement an AF function, a zoom function, an 105 function, and the like, and each may have a simplified structure and a reduced size. Also, power consumption may be significantly reduced.

Further, rotation of the reflective member may be accurately implemented in a simplified structure.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reflective module, comprising:
   a rotation plate supported by an internal wall of a housing; and
   a movable holder supported by the rotation plate and comprising a reflective member,
   wherein the movable holder is configured to move in a first axis direction perpendicular to an optical axis and in a second axis direction perpendicular to the optical axis and the first axis direction,
   wherein at least two ball members aligned in the first axis direction are disposed in at least one of a first gap between the housing and the rotation plate and a second gap between the rotation plate and the movable holder, wherein a guide groove is disposed in the rotation plate and a guide groove is disposed in at least one of the housing and the movable holder, and the ball members are inserted into the guide grooves, and wherein the ball members are inserted into and three-point supported by the guide grooves, respectively.

2. The reflective module of claim 1, wherein each guide groove comprises three side surfaces on which the respective ball member is three-point supported.

3. The reflective module of claim 2, wherein lines formed by extending the three side surfaces of each guide groove form a triangular pyramid.

4. The reflective module of claim 3, wherein the triangular pyramid is an equilateral triangular pyramid.

5. The reflective module of claim 4, wherein each guide groove has a shape formed by cutting four corners of the triangular pyramid.

6. The reflective module of claim 5, wherein an internal bottom surface of each guide groove has a triangular shape.

7. The reflective module of claim 6, wherein each ball member does not contact the bottom surface of the respective guide groove.

8. The reflective module of claim 6, wherein side surfaces of each guide groove include three first surfaces by which the ball member is supported and three second surfaces disposed adjacent to two of the three first surfaces.

9. The reflective module of claim 8, wherein each ball member does not contact any of the second surfaces.

10. The reflective module of claim 5, wherein an opening of each guide groove has a hexagonal shape.

11. The reflective module of claim 1,
wherein at least two first ball members aligned in the first axis direction are disposed in the first gap, and wherein at least two second ball members aligned in the second axis direction are disposed in the second gap.

12. The reflective module of claim 11,
wherein the rotation plate is configured to rotate with respect to a first axis of the first axis direction, and
wherein the movable holder is configured to rotate with respect to a second axis of the second axis direction.

13. The reflective module of claim 1,
wherein the housing comprises one of a pulling yoke or a pulling magnet and the movable holder comprises the other of the pulling yoke or the pulling magnet, and
wherein the movable holder and the rotation plate are supported by the internal wall of the housing by attractive force produced between the pulling yoke and the pulling magnet.

14. The reflective module of claim 1,
wherein a number of the at least two ball members aligned in the first axis direction is two, and
wherein the guide grooves are configured to be symmetrical to each other with respect to a line in parallel to the second axis direction.

15. A camera module, comprising:
a housing defining an internal space;
the reflective module of claim 1 disposed in the internal space; and
a lens module comprising at least one lens barrel aligned in an optical axis direction to receive incident light reflected from the reflective member, the at least one lens barrel comprising a plurality of lenses configured to selectively move in the optical axis direction.

16. The camera module of claim 15, further comprising:
a guide groove disposed in the rotation plate and a guide groove disposed in at least one of the housing and the movable holder, wherein an opening of each guide groove has a hexagonal shape.

17. The camera module of claim 15,
wherein at least two ball members aligned in the first axis direction are disposed in at least one of a first gap between the housing and the rotation plate and a second gap between the rotation plate and the movable holder.

18. The camera module of claim 15,
wherein the rotation plate is configured to rotate with respect to a first axis of the first axis direction, and
wherein the movable holder is configured to rotate with respect to a second axis of the second axis direction.

19. The reflective module of claim 1,
wherein the reflective module is implemented as a folded module moveably accommodated in an internal space of the housing.

* * * * *